United States Patent [19]
Sommer et al.

[11] Patent Number: 5,618,324
[45] Date of Patent: Apr. 8, 1997

[54] FILTER INSERT

[75] Inventors: Bruno Sommer, Ludwigsburg; Helmut Luka, Kornwestheim; Thomas Schürg, Ludwigsburg; Siegfried Rapp, Murr; Nikolaus Moser, Ditzingen, all of Germany

[73] Assignee: Filterwerk Mann & Hummel GmbH, Germany

[21] Appl. No.: 701,189

[22] Filed: Aug. 21, 1996

Related U.S. Application Data

[63] Continuation of Ser. No. 624,937, Mar. 27, 1996, abandoned, and Ser. No. 237,886, May 4, 1994, abandoned.

[30] Foreign Application Priority Data

May 4, 1993 [DE] Germany .......................... 43 14 563.9

[51] Int. Cl.⁶ .................................................. B01D 46/00
[52] U.S. Cl. .............................. 55/497; 55/499; 55/500; 55/502; 55/DIG. 31
[58] Field of Search .................... 55/385.3, 497, 55/499, 500, 501, 502, 521, DIG. 31

[56] References Cited

U.S. PATENT DOCUMENTS

| | | | |
|---|---|---|---|
| 2,058,669 | 10/1936 | Dollinger | 55/499 |
| 3,246,457 | 4/1966 | De Baun | 55/499 |
| 3,392,846 | 7/1968 | Getzin | 55/497 |
| 3,631,582 | 1/1972 | Lucas | 55/521 |
| 3,747,772 | 7/1973 | Brown | 55/DIG. 31 |
| 3,853,529 | 12/1974 | Boothe | 55/499 |
| 4,135,900 | 1/1979 | Westlin et al. | 55/499 |
| 4,177,050 | 12/1979 | Culbert et al. | 55/499 |
| 4,619,675 | 10/1986 | Watanabe | 55/521 |
| 4,737,174 | 4/1988 | Pontius | 55/DIG. 31 |
| 5,167,740 | 12/1992 | Michaelis et al. | |

FOREIGN PATENT DOCUMENTS

| | | | |
|---|---|---|---|
| 82106 | 6/1983 | European Pat. Off. | |
| 490169 | 6/1992 | European Pat. Off. | |
| 1407291 | 1/1972 | Germany | |
| 4002078 | 5/1991 | Germany | |
| 781194 | 8/1957 | United Kingdom | 55/499 |
| 1570385 | 7/1980 | United Kingdom | |

Primary Examiner—C. Scott Bushey
Attorney, Agent, or Firm—Evenson, McKeown, Edwards & Lenahan P.L.L.C.

[57] ABSTRACT

A filter insert for the filtering of the fresh air supplied to a motor vehicle interior has an accordion-folded filter element which is self-supporting. Lateral strips coated with an adhesive are provided on the faces which extend on the left and on the right. On the faces which extend in parallel to the folding, angle strips are arranged whose first leg extends along at least three fold edges. The filter element is surrounded along the faces by a foamed-material sealing.

20 Claims, 3 Drawing Sheets

FILTER INSERT

This application is a continuation of application Ser. No. 08/624,937 filed on Mar. 27, 1996 and application Ser. No. 08/237,886 filed on May 4, 1994, both of which are now abandoned.

BACKGROUND OF THE INVENTION

This invention relates to a filter insert for filtering the fresh air for the interior of a vehicle. Filter inserts of this type are normally made of an accordion-folded filter material, such as paper or a nonwoven.

These filter inserts are used, for example, in vehicle air-conditioning systems as well as in simple ventilating systems for vehicles. When dimensioning these filter inserts, it should be taken into account that the number of folds and the depth of the folds are functions of the required air flow rate and of the filter-technological characteristics. In this case, the pressure drop generated by the dust filter should be as minimal as possible.

During manufacturing, the filter insert is shaped first, in which case the pockets formed by the accordion folds are normally glued on the outer edges to a firm additional material. Then the individual folds, which were formed in this manner, are fixed at a distance from one another and the filter insert is inserted in a frame. By means of flexible polyurethane foam, the lower boundary edges of the filter insert are now connected with one another so that the distance of the individual folds is locked. This polyurethane foam is used simultaneously as a frame and as a sealing in order to later achieve a leakage-free connection of the filter inserted into a corresponding housing.

Some of the manufactured filter inserts do not have sufficient inherent stability and require a correspondingly expensive receiving frame for the installation. Another disadvantage concerns the recycling of the filter inserts, since additional materials, such as the polyurethane frame, must be disposed of in addition to the filter medium.

Furthermore, several working cycles are required for the known-manufacturing processes, for example, the gluing of the front edges, and the foaming or injection molding of the frame. It is also a disadvantage that the liquid sealing mass on the outer edges of the folds expands and reacts in the mold; that is, it flows also into the area under the actual fold pack and, as a result, partially closes the inflow or outflow opening so that the fold pack is not optimized with respect to the effective filter surface.

German Patent Document DE-OS 40 02 078 describes a filter insert which is made of a nonwoven that can be thermally bonded and in which the outer edge of the fold is bent and is welded by ultrasonics. However, the ultrasonic welding of such filter inserts has the disadvantage that expensive tools are required and this ultrasonic welding works reliably only in the case of a nonwoven which is made of a thermoplastic material. In the case of cellulose-containing filter materials, this process cannot be used in an optimal manner.

SUMMARY OF THE INVENTION

It is an object of the invention to provide a filter insert which can be economically manufactured of any material that can easily be disposed of.

This and other objects are achieved by the present invention which provides a filter insert for filtering fresh air supplied to a motor vehicle interior, comprising a self-supporting accordion-folded filter element that has left and right side faces, and faces which extend in parallel to the folds of the filter element, and lateral strips which are coated with an adhesive being provided on the left and the right side faces of the filter element. The filter insert has angle strips having first and second legs, with the first legs arranged on the faces which extend in parallel to the folds of the filter element, and the second legs extending along at least three fold edges of the filter element. A foam sealing material extends along the faces which extend in parallel to the folds of the filter element, and also extends along the left and right side faces of the filter element.

The objects are also achieved by an embodiment of the present invention which provides a process for the manufacturing of a filter insert, comprising the steps of accordion-folding a filter paper to form a filter element with faces, bringing the faces of the filter element in contact with lateral strips provided with an adhesive, heating this adhesive and exercising a contact pressure on the lateral strips to connect the lateral strips with the filter element, arranging angle strips, which have a melting adhesive, under the effect of heat on the faces which extend in parallel to the folds of the filter element, and surrounding the faces with a surrounding foam sealing material.

Because of its construction, the filter insert according to the invention is resistant to bending in three coordinate directions. Due to the self-supporting construction, the handling and the mounting is facilitated and the constructive design of the receiving device and the application of the sealing are simplified. In addition, this type of a filter insert may, after its use, also easily be disposed of thermally because it consists essentially of cellulose fibers. By means of the thermal gluing of the face side cover as well as of the angle strips, a high production rate can be achieved and therefore an economical manufacturing of the filter.

For increasing the stability of the filter insert, it is provided according to a further development of the invention, to mount reinforcing strips on the surface of the filter insert. The reinforcing strips increase the stability of the filter transversely of the course of the folds and therefore, at the same time, also increase the operational dependability of the filter. Leakages in the sealing area are therefore avoided.

In certain advantageous embodiments of the invention, the lateral strips are provided with a sealing angle. This sealing angle extends along the front edges toward the interior and may be applied to a sealing fixed to the housing. As a result, an additional sealing by means of foamed material is not required.

Advantageously, all components of the filter insert are made of the material of the filter element. During the disposal, a separation will therefore not be required and a thermal disposal is therefore possible without any problem.

The material is connected with the filter element by means of an adhesive which can be activated thermally, in which case it is expedient to dimension the material thickness of the lateral strips or of the angle strips in such a manner that a heat transmission to the adhesive or to the contact surface with the filter element is ensured that is as good as possible. The elements to be glued to the filter insert may have a wall thickness less than or equal to the material thickness of the filter element.

The process for the manufacturing of the insert according to the invention is distinguished by its simplicity and high economic efficiency. The manufacturing can be automated at low cost. As a result, a continuously high quality of the produced filter insert is achieved.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
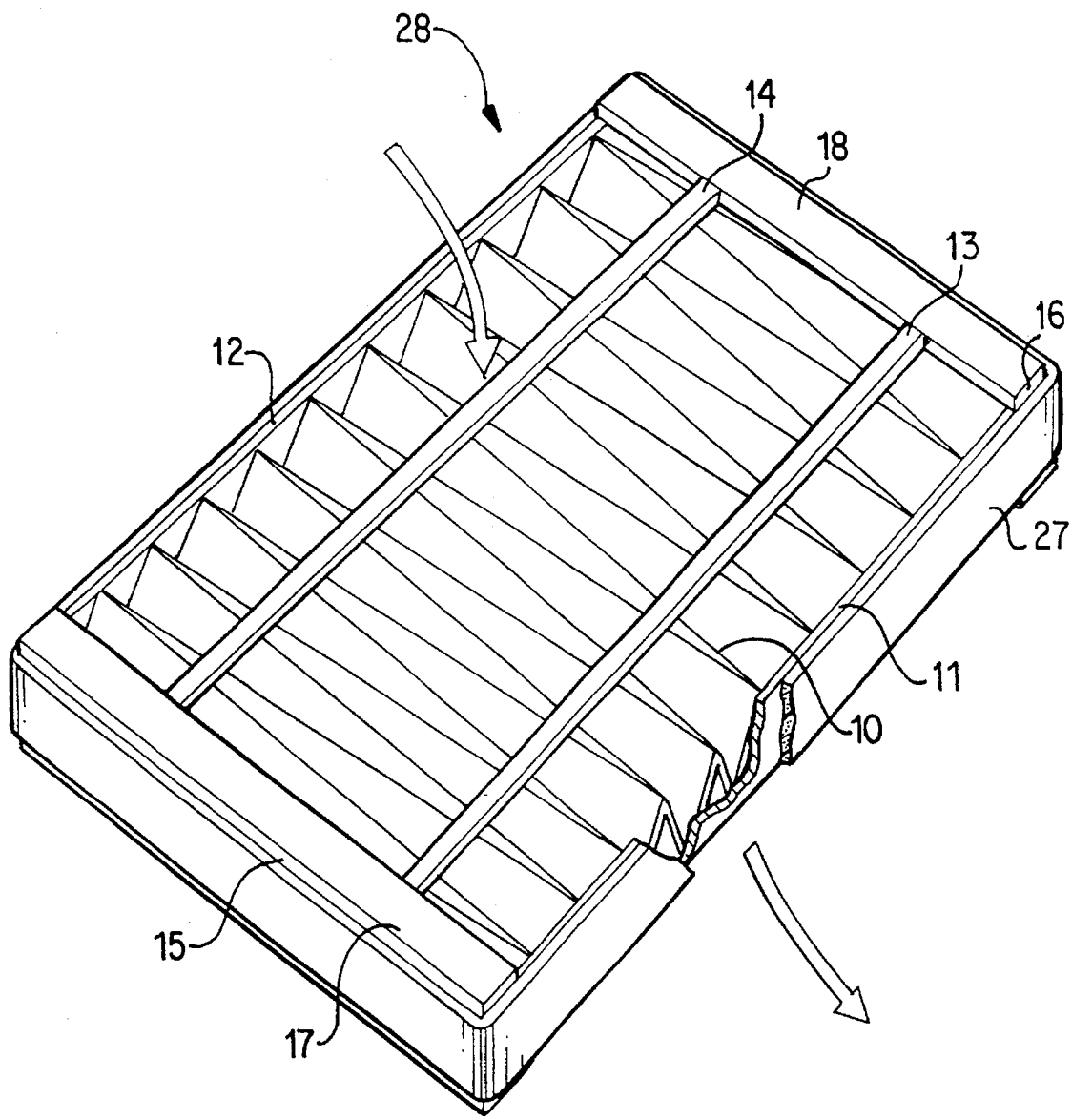
FIG. 1 is a perspective, partially cut-away view of a filter insert constructed in accordance with an embodiment of the present invention.

The filter insert according to FIG. 1 is made of an accordion-folded filter material, such as a paper filter element 10. Lateral strips 11, 12 are provided on the longitudinal sides of this filter element 10. By means of an adhesive, these lateral strips 11, 12 are connected with the faces of the filter element 10, which ensures a connection that is impermeable to dirt. Two reinforcing strips 13, 14 are arranged on the top of the filter element 10. These reinforcing strips 13, 14 are connected with the filter element 10 by an adhesive which can be thermally activated. The reinforcing strips 13, 14 are used for the longitudinal stabilization of the filter element 10.

Up to now, so-called "glue beads" were normally used for the longitudinal stabilization. These glue beads were applied before the folding of the filter element and connected the folds with one another at the point of application. However, the disadvantage of these glue beads is the large amount of melded bonding agent compared with the minimal application of bonding agent (0.3 mm) in the case of the reinforcing strips 13, 14 of the present invention. The reinforcing strips 13, 14 reduce the filter surface only insignificantly.

Angle strips 15, 16 are arranged on the front face and on the rear face of the filter element. By means of their upper legs 17, 18, these angle strips 15, 16 extend over at least three folds of the filter element so that the bending moment of the angle strips 15, 16 is increased. In combination with the reinforcing strips 13, 14, an inserted filter is created which has a high dimensional stability.

The lateral strips 11, 12 and the angle strips 15, 16 are bordered by a foam sealing material 27. This foam sealing material 27 is provided, for example, with a self-adhesive layer and is therefore undetachably connected with the faces of the lateral strips 11, 12 and the angle strips 15, 16. The illustrated embodiment of the filter insert 28 of FIG. 1 has no holding clips. The inserting of the filter insert 28 takes place manually by a pressing into the provided frame (not illustrated). During the removal process, the filter insert 28 may be destroyed because it is not to be blown out or knocked out and used again, but a new filter insert must always be used.

Figure 4:
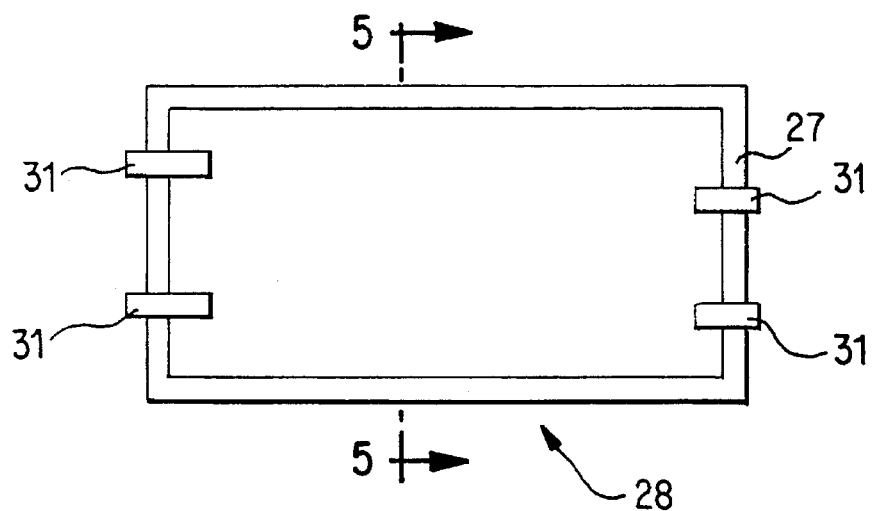
FIG. 4 is a top view of an embodiment of the filter insert which has removal clips.

Naturally, there is also the possibility of providing the filter insert 28 with so-called "removal clips 31". An embodiment of the invention using the removal clips 31 is shown in FIG. 4. These clips 31 are arranged on the filter tips in the area of the narrow sides of the filter insert 28 and permit the removal of the filter insert 28. The removal clips 31 may be fastened on the lateral ends of the filter by adhesives or by ultrasonic welding. However, also in the case of such a filter insert 28, it must be ensured that it will not be used again but that a new filter insert 28 is installed.

Figure 2:
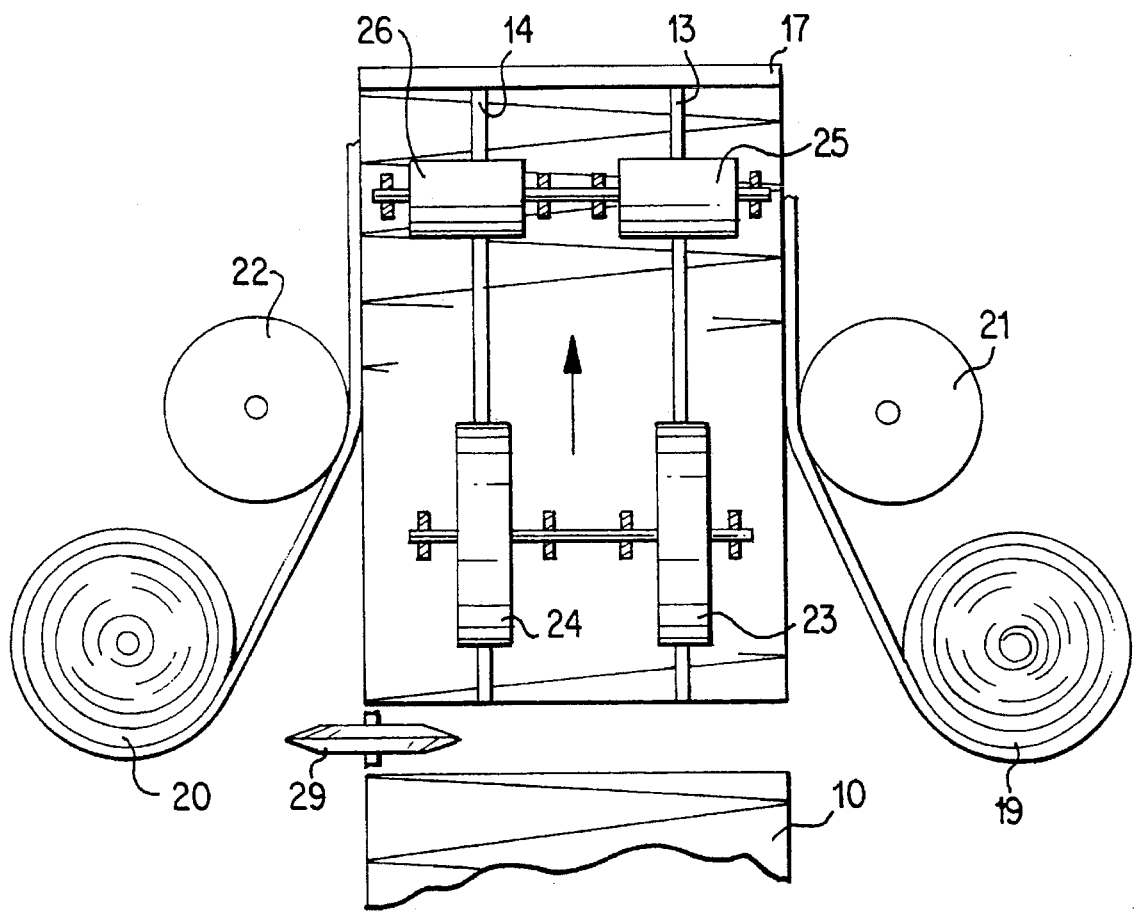
FIG. 2 is a view of a cutout from the manufacturing process for the manufacturing of the filter insert according to FIG. 1.

FIG. 2 is a cutout sectional view illustrating the manufacturing process of the filter insert 28. In a device which is not shown here, the filter element is first accordion-folded. It is then cut to length by a slitting wheel 29. The material of the lateral strips 11, 12 is situated on two laterally arranged rollers 19, 20. This material is fed via contact pressure rollers 21, 22 and is, at the same time, heated by these contact pressure rollers 21, 22 and thermally connected with the filter element 10. The reinforcing strips 13, 14 are arranged in parallel to the lateral strips 11, 12. The reinforcing strips 13, 14 are also taken off rollers 23, 24 and, via heatable contact pressure rollers 25, 26, are glued onto the filter element 10 or are welded on by ultrasonic welding processes.

The gluing-on of the angle strips 15, 16 and the mounting of the surrounding foam sealing material 27 takes place in a subsequent operation.

Figure 3:
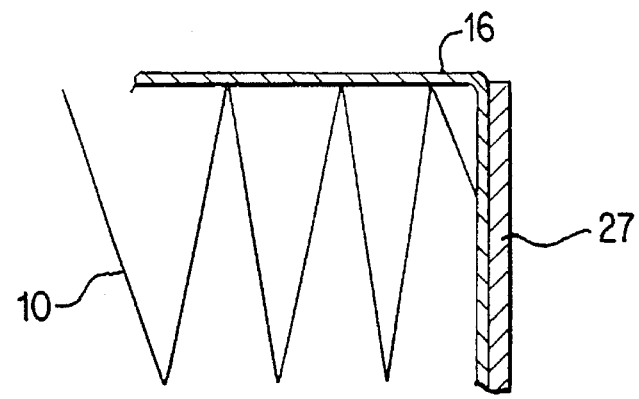
FIG. 3 is a sectional view of the connection of the angle strips to the filter element.

FIG. 3 illustrates one of the angle strips 16 connected to the end of the filter element 10 and to the surrounding foam sealing material 27. This figure also illustrates that one leg of the angle strip 16 may extend over and be connected to at least three folds of the filter element 10. These connections may be made with adhesive, for example.

Figure 5:
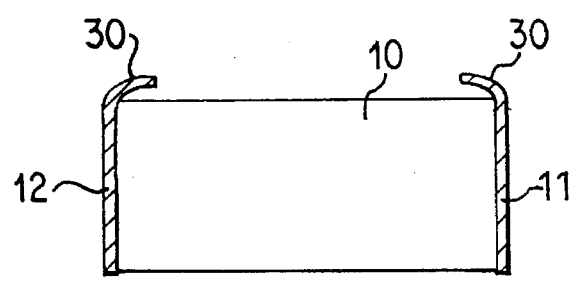
FIG. 5 is a sectional view along line A—A of FIG. 4.

FIG. 5 shows a cross-section along line A—A of FIG. 4. The lateral strips 11, 12 are shown to have a bend 30 at their top so that these bends 30 form a sealing face on the top side of the filter element 10. Although this sectional view is illustrated only with the embodiment of FIG. 4, the same arrangement of lateral strips 11, 12 can be used in the embodiment illustrated in FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A filter insert for filtering air, comprising:

a self-supporting accordion-folded filter element that has top and bottom sides, left and right side faces, and end faces which extend parallel to the folds of the filter element;

planar lateral strips which are adhesively bonded to the left and the right side faces of the filter element;

angle strips having first and second legs, with the first legs arranged on the end faces which extend parallel to the folds of the filter element, and the second legs each extending along the top side over at least one fold edge of the filter element and being adhesively bonded to said at least one fold edge;

at least one planar reinforcing strip arranged on the top side of the filter insert extending transversely of and adhesively bonded to fold edges of the filter element; and a foam sealing material extending along the end faces which extend parallel to the folds of the filter element, and the left and right side faces of the filter element, wherein a full extent of the filter element between said left side face and said right side face is exposed to air flow.

2. A filter insert according to claim 1, wherein the elements which are adhesively bonded to the filter element are provided with an adhesive which is thermally activatable.

3. A filter insert according to claim 1, further comprising removal clips fastened on lateral ends of the filter by adhesives.

4. A filter insert according to claim 1, further comprising removal clips fastened on lateral ends of the filter by ultrasonics.

5. A filter insert according to claim 1, wherein the first legs of the angle strips are adhesively bonded to the end faces which extend parallel to the folds of the filter element.

6. A filter insert according to claim 1, wherein a full extent of the bottom side of the filter element between said end faces which extend parallel to the folds of the filter element is exposed to air flow.

7. A filter insert according to claim 5, wherein a full extent of the bottom side of the filter element between said end faces which extend parallel to the folds of the filter element is exposed to air flow.

8. A filter insert according to claim 1, wherein the angle strips, the lateral strips, the at least one reinforcing strip, and the filter element are made of an identical material.

9. A filter insert according to claim 7, wherein the angle strips, the lateral strips, the at least one reinforcing strip, and the filter element are made of an identical material.

10. A filter insert according to claim 1, wherein the angle strips, the at least one reinforcing strip, and the lateral strips have a wall thickness less than or equal to the material thickness of the filter element.

11. A filter insert according to claim 9, wherein the angle strips, the at least one reinforcing strip, and the lateral strips have a wall thickness less than or equal to the material thickness of the filter element.

12. A filter insert according to claim 1, wherein the second legs of the angle strips each extend along the top side of the filter element over at least three fold edges of the filter element.

13. A filter insert for filtering air, comprising:

a self-supporting accordion-folded filter element that has top and bottom sides, left and right side faces, and end faces which extend parallel to the folds of the filter element;

planar lateral strips which are adhesively bonded to the left and the right side faces of the filter element; and angle strips having first and second legs, with the first legs arranged on the end faces which extend parallel to the folds of the filter element, and the second legs each extending along the top side over at least one fold edge of the filter element, wherein the filter element is adhesively bonded to at least one of said first legs of the angle strips and said second legs of the angle strips, and wherein a full extent of the filter element between said left side face and said right side face is exposed to air flow.

14. A filter insert according to claim 13, wherein the end faces which extend parallel to the folds of the filter element are adhesively bonded to the first legs of the angle strips, respectively, and at least one fold edge of the filter element is adhesively bonded to the second legs of the angle strips, respectively.

15. A filter insert according to claim 13, further comprising at least one planar reinforcing strip arranged on the top side of the filter insert extending transversely of and adhesively bonded to fold edges of the filter element.

16. A filter insert according to claim 14, further comprising at least one planar reinforcing strip arranged on the top side of the filter insert extending transversely of and adhesively bonded to fold edges of the filter element.

17. A filter insert according to claim 13, further comprising a foam sealing material extending along the end faces which extend parallel to the folds of the filter element, and the left and right side faces of the filter element.

18. A filter insert according to claim 15, further comprising a foam sealing material extending along the end faces which extend parallel to the folds of the filter element, and the left and right side faces of the filter element.

19. A filter insert according to claim 13, wherein a full extent of the bottom side of the filter element between said end faces which extend parallel to the folds of the filter element is exposed to air flow.

20. A filter insert according to claim 16, wherein a full extent of the bottom side of the filter element between said end faces which extend parallel to the folds of the filter element is exposed to air flow.

* * * * *